United States Patent
Kim et al.

(10) Patent No.: US 9,679,666 B2
(45) Date of Patent: Jun. 13, 2017

(54) URANIUM DIOXIDE NUCLEAR FUEL PELLET HAVING METALLIC MICROCELLS AND FABRICATING METHOD THEREOF

(71) Applicants: Korea Atomic Energy Research Institute, Daejeon (KR); Korea Hydro & Nuclear Power Co., Ltd, Gyeongju-si, Gyeongsangbuk-do (KR)

(72) Inventors: Keon-Sik Kim, Daejeon (KR); Yang-Hyun Koo, Daejeon (KR); Jong-Hun Kim, Daejeon (KR); JangSoo Oh, Cheonan-si (KR); Young Woo Rhee, Daejeon (KR); Dong-Joo Kim, Daejeon (KR); Jae-Ho Yang, Sejong-si (KR)

(73) Assignees: Korea Atomic Energy Research Institute, Daejeon (KR); Korea Hydro & Nuclear Power Co., Ltd., Daejeon (KR)

(*) Notice: Subject to any disclaimer, the term of this patent is extended or adjusted under 35 U.S.C. 154(b) by 635 days.

(21) Appl. No.: 14/061,662

(22) Filed: Oct. 23, 2013

(65) Prior Publication Data
US 2014/0185731 A1    Jul. 3, 2014

(30) Foreign Application Priority Data

Dec. 31, 2012 (KR) .................. 10-2012-0158686
Jul. 18, 2013 (KR) .................. 10-2013-0084884

(51) Int. Cl.
G21C 21/02      (2006.01)
G21C 3/04       (2006.01)
(Continued)

(52) U.S. Cl.
CPC ............... *G21C 3/044* (2013.01); *G21C 3/58* (2013.01); *G21C 21/02* (2013.01); *G21C 3/17* (2013.01);
(Continued)

(58) Field of Classification Search
CPC . G21C 21/02; G21C 3/17; G21C 3/58; G21C 2003/045
(Continued)

(56) References Cited

U.S. PATENT DOCUMENTS 5,180,527 A * 1/1993 Hirai .................. G21C 3/62
                                                   376/419
5,999,585 A * 12/1999 Dehaudt ............. G21C 3/623
                                                   376/422
(Continued)

FOREIGN PATENT DOCUMENTS

JP        6-186369 A     7/1994
JP        09-501491 A    2/1997
(Continued)

*Primary Examiner* — Jack W Keith
*Assistant Examiner* — Daniel Wasil
(74) *Attorney, Agent, or Firm* — Knobbe Martens Olson & Bear LLP

(57) ABSTRACT

Disclosed is a uranium dioxide nuclear fuel pellet, which includes metallic microcell partitions having a high protection capacity for fission products and a high thermal conductivity simultaneously. These metal microcell partitions are arranged in the nuclear fuel pellet to trap fission products. Further disclosed is a method of making the uranium dioxide nuclear fuel pellet. The method includes providing a mixture of uranium dioxide powder and additive powder of Cr-containing compound or Mo-containing compound; compressing the powder mixture to form a green pellet; and then sintering the green pellet under reducing gas environment to form the metallic microcell partitions.

13 Claims, 2 Drawing Sheets

(51) Int. Cl.
*G21C 3/58* (2006.01)
*G21C 3/17* (2006.01)
(52) U.S. Cl.
CPC ........ *G21C 2003/045* (2013.01); *Y02E 30/38* (2013.01)
(58) Field of Classification Search
USPC .......................................................... 376/418
See application file for complete search history.

(56) References Cited

U.S. PATENT DOCUMENTS

| | | |
|---|---|---|
| 6,221,286 B1 | 4/2001 | Dehaudt et al. |
| 8,989,340 B2 * | 3/2015 | Kang ..................... G21C 3/623 376/418 |
| 2004/0103752 A1 | 6/2004 | Song et al. |
| 2010/0091933 A1 * | 4/2010 | Song ........................ G21C 3/58 376/414 |
| 2012/0098149 A1 * | 4/2012 | Yang ........................ G21C 3/62 264/0.5 |
| 2014/0185730 A1 | 7/2014 | Kim et al. |

FOREIGN PATENT DOCUMENTS

| | | | | |
|---|---|---|---|---|
| KR | 10-1993-0008873 A | 5/1993 | | |
| KR | 10-2010-0041982 A | 4/2010 | | |
| KR | 10-2010-0052977 A | 5/2010 | | |
| KR | 10-2011-0020044 | * | 3/2011 | ............... G21C 3/62 |
| KR | 10-2011-0020044 A | 3/2011 | | |

* cited by examiner

UO2 Nuclear
Fuel Pellet

Microcell in UO2 Nuclear Fuel Pellet

URANIUM DIOXIDE NUCLEAR FUEL PELLET HAVING METALLIC MICROCELLS AND FABRICATING METHOD THEREOF

FIELD

The present disclosure relates to a uranium dioxide ($UO_2$) pellet and a method of making the same.

BACKGROUND

Nuclear power plant uses heat generated by nuclear fission of uranium, and an $UO_2$ sintered pellet is generally used as nuclear fuel for nuclear power plant. The $UO_2$ sintered pellet may be produced by sintering a green pellet, which is obtained by compressing uranium oxide powder, in a reducing gas atmosphere at about 1,700-1,800° C. for 2-8 hours. The $UO_2$ sintered pellet produced by such an existing method has a density of about 96% TD (theoretical density) and a grain size of about 8-14 μm.

Recently, high burnup nuclear fuels have been developed, which are burnt for a long time in order to increase economic efficiency of nuclear fuel and reduce an amount of spent fuel. As the burnup of nuclear fuel increases, a generation amount of fission products such as Xe, Kr, Cs and I increases. The increased fission product will increase stress in a cladding tube, which may deteriorate the safety of nuclear fuel. Accordingly, in order to overcome those limitations, fission product must be released from the pellet as little as possible.

In addition, after Hukusima nuclear power plant accident, there are increasing demands for development of $UO_2$ nuclear fuel pellets with an enhanced accident resistance to trap highly radioactive fission product as much as possible to prevent the release of fission products having a high level of radioactivity outside the environments.

The fission product is the material generated during the fission caused after fissile materials (a typical example of such fissile materials is U-235) absorb thermal neutron. When fission occurs in $UO_2$ nuclear fuel, one uranium atom is split into two fission products. Fission products can be classified into four groups in terms of their volatility and chemical activity: volatile fission product including fission gases, semi-volatile fission product, fission product that are low volatile, and non-volatile fission product. Among the four groups, volatile fission product (I and Cs) and fission gases (Xe and Kr), are most important in terms of fuel degradation and radiological consequence because they have very strong chemical activity and are also easily released outside the fuel pellet and environment.

SUMMARY

Accordingly, the present disclosure provides a uranium dioxide nuclear fuel pellet having metallic microcells arranged therein and a fabricating method thereof.

One aspect of the invention provides a uranium dioxide nuclear fuel pellet, which may comprise: microcells defined by micro-partitions comprising a metallic element; and uranium dioxide contained in the microcells such that at least part of fission products would be trapped in the microcells upon fissioning.

In the foregoing uranium dioxide nuclear fuel pellet, the metallic element may be Cr or Mo. An average size of the microcells may be about 30 μm to about 400 μm. A ratio of the micro-partitions with respect to the uranium dioxide is about 0.1% to about 10.0% by weight. A single grain of the uranium oxide is filled in each of at least some of the microcells. One of the micro-partitions may be located between two immediately neighboring grains of the uranium oxide and contacts the two immediately neighboring grains of the uranium oxide. The micro-partition located between the two immediately neighboring grains of the uranium oxide may completely separate the two immediately neighboring grains of the uranium oxide not to contact each other. The micro-partition located between the two immediately neighboring grains of the uranium oxide may have a hole allowing the two immediately neighboring grains to contact each other. The micro-partitions may be configured to inhibit the fission products from passing therethrough. The uranium dioxide may be filled in the microcells. The partitions may have heat conductivity greater than that of the uranium dioxide.

Another aspect of the invention provides a method of making a uranium dioxide nuclear fuel pellet, which comprises: providing a mixture of uranium dioxide powder and additive powder comprising a metallic element; compressing the powder mixture to form a pellet; and sintering the pellet at a temperature at which at least part of the additive powder is changed into liquid which permeates between grains of the uranium oxide thereby forming micro-partitions comprising the metallic element and defining microcells in which the uranium dioxide is contained.

In the foregoing method, the additive powder may comprise a Cr-compound or a Mo-compound. In the mixture, a ratio of the additive powder with respect to the uranium dioxide powder may be about 0.1% to about 10.0% by weight. The additive powder may comprise at least one selected from the group consisting of metal, oxide, nitride, sulfide, fluoride, chloride, stearate, carbonate, nitrate and phosphate. The sintering temperature may be about 1600° C. to about 1800° C. The pellet may be sintered under reducing gas atmosphere of a reducing gas, which comprises a hydrogen-containing gas. The hydrogen-containing gas may comprise a mixture of a hydrogen gas and at least one selected from a group consisting of carbon dioxide, water vapor and inert gas. The additive powder may comprise a metal oxide, wherein once the micro-partitions of the metal oxide are formed, the micro-partitions of the metal oxide is reduced thereby forming the micro-partitions of the metallic element. The metallic element may be Cr or Mo. Grains of the uranium oxide having a size of about 30 μm to about 400 μm are formed during sintering.

An aspect of the invention provides a fission product trapping uranium dioxide nuclear fuel pellet having metal microcells formed of a metallic material having a high protection capacity for fission products, with a size of 30 to 400 μm (with respect to a 3-dimentional size) to retrain extraction of the fission products in a normal operation and an accident condition by trapping the fission products in the metallic cells and also that is able to make microcell walls formed of a metallic material having a high thermal conductivity to decrease a central temperature of fuel pellets, such that the movement speed of the fission products may be lowered and the stress applied to the fuel cladding may be reduced to mitigate PCI and to enhance the performance and stability of the nuclear fuel.

Another aspect of the present invention provides a fabricating method of the $UO_2$ nuclear fuel pellet that is able to trap and collect fission products in microcells by arranging metallic microcells having a high protection capacity for fission products, so as to restrain the extraction of the fission products outside.

Additional advantages and features of the disclosure will be set forth in part in the description which follows and in part will become apparent to those having ordinary skill in the art upon examination of the following or may be learned from practice of the invention. The aspects and other advantages of the invention may be realized and attained by the structure particularly pointed out in the written description and claims hereof as well as the appended drawings.

To achieve these features and other advantages and in accordance with the purpose of the embodiments, as embodied and broadly described herein, a uranium dioxide nuclear fuel pellet includes metallic microcells having a high protection capacity for fission products and a high thermal conductivity simultaneously arranged in the nuclear fuel pellet to trap fission products, such that extraction of fission products may be restrained in a normal operation condition and an accident condition and that PCI may be mitigated by reducing a stress applied to a nuclear fuel cladding.

In a further aspect of the present invention, a fabricating method of a uranium dioxide nuclear fuel pellet comprising metallic microcells arranged therein, the fabricating method includes steps of fabricating a powder mixture by mixing a uranium dioxide powder with an additive powder comprising a metallic element having a high protection capacity for fission products and a high thermal conductivity simultaneously; fabricating a pellet by compressing the powder mixture; and sintering the pellet at 1600 to 1800° C. under a reducing gas atmosphere.

The embodiments have the following advantageous effects. A fission product trapping uranium dioxide nuclear fuel pellet may have metal microcells formed of a metallic material having a high protection capacity for fission products. Accordingly, extraction of fission products may be restrained in a normal operation condition and an accident condition as much as possible.

Furthermore, the fission product trapping uranium dioxide nuclear fuel pellet having metallic microcells arranged therein is able to make microcell walls formed of a metallic material having a high thermal conductivity to decrease a central temperature of the fuel pellets. Accordingly, the movement speed of the fission products may be lowered and the stress applied to the fuel cladding may be reduced to mitigate PCI and to enhance the performance and stability of the nuclear fuel.

It is to be understood that both the foregoing general description and the following detailed description of the embodiments or arrangements are exemplary and explanatory and are intended to provide further explanation of the embodiments as claimed.

DETAILED DESCRIPTION OF EMBODIMENTS

Figure 1:
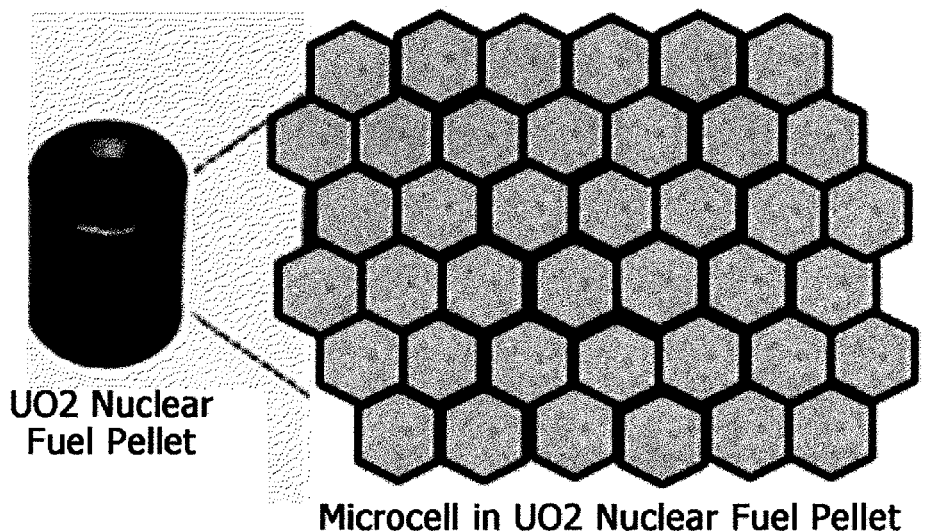
FIG. 1 is a conceptual diagram illustrating microcells arranged in an uranium dioxide nuclear fuel pellet according to the present invention.

Various embodiments of a fission product trapping pellet with metallic microcells arranged therein and a fabricating method thereof will be described as follows, referring to the accompanying drawings. Reference will now be made in detail to the specific embodiments of the present invention, examples of which are illustrated in the accompanying drawings. Wherever possible, the same reference numbers will be used throughout the drawings to refer to the same or like parts.

In uranium oxide pellets without any barriers or walls between grains, the fission product is produced within grains and diffused to grain boundary, and exists as bubbles. When the fission product reaches a predetermined amount, a bubble tunnel is formed along the grain boundary, and the fission product is released from the pellet through the bubble tunnel.

As the grain size of the pellet increases, the diffusion distance of fission product to the grain boundary becomes longer. Therefore, the fission product remains within the pellet for a longer time, thus reducing a released amount of the fission product. Thus, high burnup nuclear fuel pellet may have an increased grain size.

$UO_2$ nuclear fuel pellet is inserted in a zirconium alloy unclear fuel cladding which is deformed inwardly during the burn-up and the nuclear fuel pellet is swollen outwardly by neutron irradiation, such that the nuclear fuel pellet and the cladding may contact with each other to generate stress. Especially, it is more likely to operate a nuclear fuel for an ultrahigh burnup level in an extreme situation such as a high power or a transition operation. When the output power is increased for a relatively short time, the temperature of the nuclear fuel pellet is increased and a predetermined pressure is applied to the fuel cladding by heat expansion. When high stress is applied to the fuel cladding at a high burnup level for a relatively short time, there might be damage on the fuel cladding. Accordingly, to reduce the pressure applied to the fuel cladding generated by the thermal expansion of the nuclear fuel pellet, a new pellet having an increased amount of initial deformation and an increased rate of creep deformation is developed and Pellet-Clade interaction (hereinafter, PCI) characteristics are enhanced.

In addition, when a central temperature of a nuclear fuel is lowered by heightening a thermal conductivity of the nuclear fuel pellet, the movement speed of the fission product is decreased and the extraction of the fission product can be reduced. At the same time, a stress applied to the nuclear fuel cladding by the expansion of the pellet can be reduced and PCI can be reduced. Accordingly, it is necessary to lower the temperature of the nuclear fuel by heightening the thermal conductivity of the nuclear fuel pellet.

When the grain size of the pellet is increased the movement distance of the fission product is increased, and may slow down the extraction of the fission products. Further, an additive may be provided to heighten the creep deformation rate of the fuel pellet such that the stress applied to a fuel cladding can be reduced effectively.

FIG. 1 is a conceptual diagram illustrating microcells arranged in a uranium dioxide fission nuclear pellet according to the present invention.

There may be provided a method of trapping a fission product in a nuclear pellet ($UO_2$ pellet) having microcells arranged therein.

Figure 2:
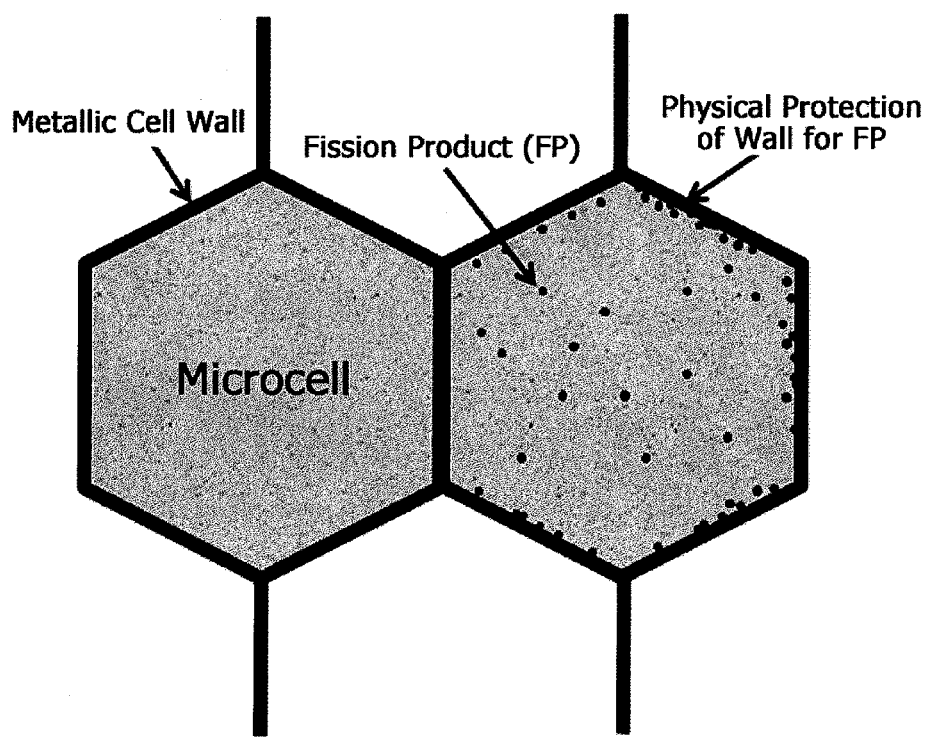
FIG. 2 is a conceptual drawing of trapping a fission product by arranging metallic microcells in the uranium dioxide nuclear fuel pellet according to the present invention.

FIG. 2 is a conceptual drawing of trapping a fission product by arranging metallic microcells in the uranium dioxide nuclear fuel pellet according to the present invention. Microcells formed of metallic elements having a high protection capacity for the fission products and a high thermal conductivity are arranged in the uranium dioxide nuclear fuel pellet, such that extraction of fission products in a normal operational condition and an accident condition may be restrained and that PCI is mitigated by reducing the stress applied to the nuclear fuel cladding.

The metallic material used in forming the microcell of the uranium dioxide nuclear fuel pellet may have a high protection capacity for the fission products and a high thermal conductivity simultaneously. It is preferred that the metallic material is Cr or Mo.

In an embodiment, the size of the microcell is within 30 to 400 μm. In embodiments, a suitable number of microcells can be formed with a small amount of an additive powder and when the average size of the microcell is in the range of about 30 to about 400 μm.

The metallic material content of the microcell is in a range of about 0.1 to about 10.0% with respect to the weight of the uranium dioxide. The content of the metallic material is in the range of about 0.1 to about 10.0% that can form the appropriate microcells in the nuclear fuel pellet and maintain the appropriate amount of the uranium per unit volume of the nuclear fuel pellet.

In addition, the metallic microcells may be formed per grain unit.

Next, a fabricating method of the uranium dioxide nuclear fuel pellet having the metallic microcells arranged therein according to the present invention will be described as follows.

The fabricating method includes steps of fabricating powder mixture by mixing the uranium dioxide powder with the additive powder that consists of metallic elements having a high protection capacity for the fission products and a high thermal conductivity; fabricating a pellet by compressing the powder mixture; and sintering the pellet at about 1600 to about 1800° C. under the reducing gas atmosphere.

According to one embodiment of the present invention, the additive added in the powder mixture fabricating step may be a compound including a metallic element having a high protection capacity for the fission products and a high thermal conductivity simultaneously, especially, Cr-compound or Mo-compound.

The compounds provided in the additive powder added in the powder mixture fabricating step may be at least one selected from the group of metal, oxide, nitride, sulfide, fluoride, chloride, stearate, carbonate, nitrate and phosphate.

According to one embodiment of the present invention, the content of the additive is about 0.1 to about 10.0% of the overall weight in the powder mixture fabricating step. The content of the metallic material is in the range of about 0.1 to about 10.0% that can confiturate the appropriate microcells in the nuclear fuel pellet and maintain the appropriate amount of the uranium per unit volume of the nuclear fuel pellet.

According to one embodiment of the present invention, the selected additive may be changed into liquid in the sintering step of performing the sintering at about 1600 to about 1800° C. under a reducing gas atmosphere. The liquid formed in the sintering may make the grain grow rapidly and the liquid is covered along a boundary of the growing grain. Accordingly, the grain unit metallic microcells having an appropriate size can be arranged.

In embodiments, the size of the microcell is within about 30 to about 400 μm. In embodiments, a suitable number of microcells can be formed with a small amount of an additive powder and when the average size of the microcell is in the range of about 30 to about 400 μm.

According to one embodiment of the present invention, the reducing gas atmosphere in the sintering step may be hydrogen-containing gas atmosphere. Especially, the hydrogen-containing gas may be a hydrogen-containing gas mixture formed of a hydrogen gas mixed with at least one selected from a group of carbon dioxide, vapor and inert gas or a hydrogen.

Next, embodiments of the present invention will be described in detail as follows. Here, the embodiments which will be described as follows are examples of the present invention and the scope of the present invention is not limited by the embodiments.

First Embodiment:

3% of $Cr_2O_3$ powder with respect to the weight of $UO_2$ powder is added to uranium dioxide ($UO_2$) powder and they are mixed with each other by a mixer for 2 hours, to prepare the powder mixture.

A green pellet is fabricated by compressing the powder mixture with 3 ton/cm$^2$.

The green pellet is heated at a heating rate of 300° C. per hour under dry hydrogen gas atmosphere having 0.1% or less of a moisture ratio, to make the temperature of the pellet reach 1720° C. After that, the heated pellet is maintained for 4 hours under a humid hydrogen gas atmosphere having 1.6% of a moisture ratio and then cooled to be 1600° C. at a cooling rate of 300° C. per hour under the dry hydrogen gas atmosphere. After that, the cooled pellet is maintained at 1600° C. for 10 hours and cooled to be a normal temperature. Accordingly, the uranium dioxide unclear fuel pellet may be fabricated.

The density of the fabricated nuclear fuel pellet is measured based on Archimedes' principle and a cross section of the nuclear fuel pellet having the density measured is polished like a mirror. After that, the size and structure of the microcell is observed.

It is measured that the density of the nuclear fuel pellet fabricated in the process mentioned above is 96.4% of TD and that an average size of the microcell is 92 μm.

Figure 3:
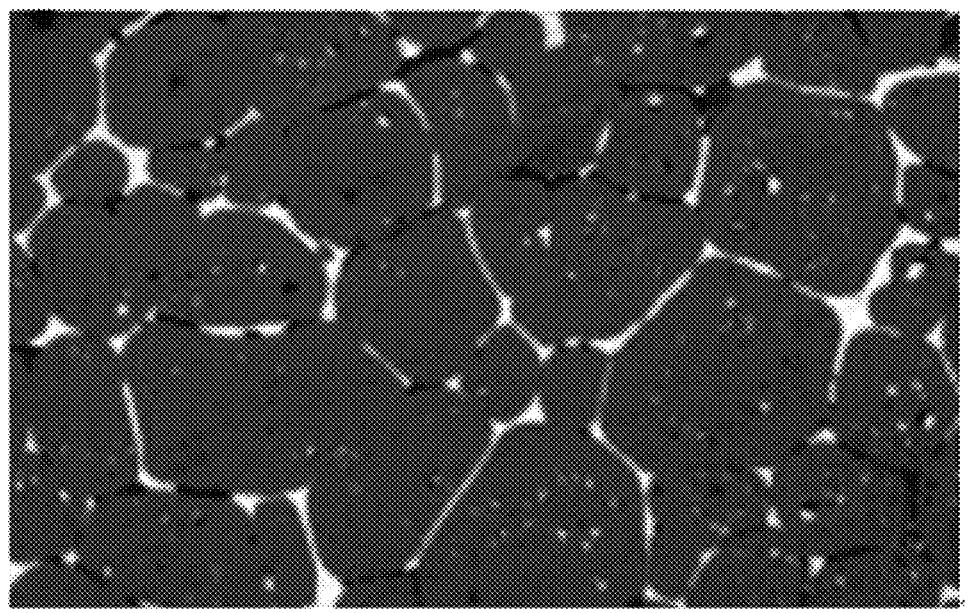
FIG. 3 is an optical micrograph image of a metallic microcell structure of a uranium dioxide nuclear fuel pellet fabricated according to a first embodiment of the present invention.

FIG. 3 is an optical micrograph image of a metallic microcell structure of a uranium dioxide nuclear fuel pellet fabricated in the process. As shown in FIG. 3, the metallic microcells are formed along the grain boundary.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents. In addition to variations and modifications in the component parts and/or arrangements, alternative uses will also be apparent to those skilled in the art.

What is claimed is:

1. A method of making a uranium dioxide nuclear fuel pellet, the method comprising:
   providing a mixture of uranium dioxide powder and additive powder consisting essentially of a Cr-containing compound or a Mo-containing compound;
   compressing the powder mixture to form a green pellet; and
   sintering the green pellet under reducing gas environment to convert at least part of the additive powder into liquid which permeates between grains of the uranium dioxide thereby forming micro-partitions consisting essentially of Cr or Mo and defining microcells in which the uranium dioxide is contained, the reducing gas environment comprising hydrogen gas and water vapor, wherein during sintering the green pellet is maintained to a first temperature under humid hydrogen gas and subsequently cooled to a second temperature under dry hydrogen gas having 0.1% moisture or less, the humid hydrogen gas containing more moisture than the dry hydrogen gas, the second temperature being lower than the first temperature.

2. The method of claim 1, wherein, in the mixture, a ratio of the additive powder with respect to the uranium dioxide powder is about 0.1% to about 10.0% by weight.

3. The method of claim 1, wherein the additive powder comprises at least one selected from the group consisting of oxide, nitride, sulfide, fluoride, chloride, stearate, carbonate, nitrate and phosphate.

4. The method of claim 1, wherein the sintering temperature is about 1600° C. to about 1800° C.

5. The method of claim 1, wherein the Cr-containing compound or the Mo-containing compound is chromium oxide or molybdenum oxide, wherein sintering causes to form micro-partitions consisting essentially of chromium oxide or molybdenum oxide, which are then changed to the micro-partitions consisting essentially of Cr or Mo by reduction in the reducing gas environment.

6. The method of claim 1, wherein grains of the uranium dioxide having a size of about 30 μm to about 400 μm are formed during sintering.

7. The method of claim 1, wherein the humid hydrogen gas having 1.6% moisture therein.

8. The method of claim 1, wherein prior to being maintained at the first temperature, the green pellet is heated under dry hydrogen gas having 0.1% moisture or less.

9. The method of claim 1, wherein prior to being maintained at the first temperature, the green pellet is heated at a heating rate of 300° C. per hour under dry hydrogen gas having 0.1% moisture or less.

10. The method of claim 1, wherein prior to being maintained at the first temperature, the green pellet is heated under dry hydrogen gas having 0.1% moisture or less, wherein the humid hydrogen gas having 1.6% moisture therein.

11. The method of claim 1, wherein the first temperature is 1720° C. and the second temperature is 1600° C.

12. The method of claim 1, wherein cooling to the second temperature is at a cooling rate of 300° C. per hour under the dry hydrogen gas having 0.1% moisture or less.

13. The method of claim 1, wherein subsequent to cooling to the second temperature, the cooled pellet is maintained at the second temperature for 10 hours and subsequently cooled to lower temperature.

* * * * *